March 13, 1934. L. GALTER 1,951,144
MAILING FOLDER
Filed March 30, 1933 2 Sheets-Sheet 1

Inventor:
Louis Galter
John C. Carpenter
Atty.

March 13, 1934. L. GALTER 1,951,144
MAILING FOLDER
Filed March 30, 1933 2 Sheets-Sheet 2
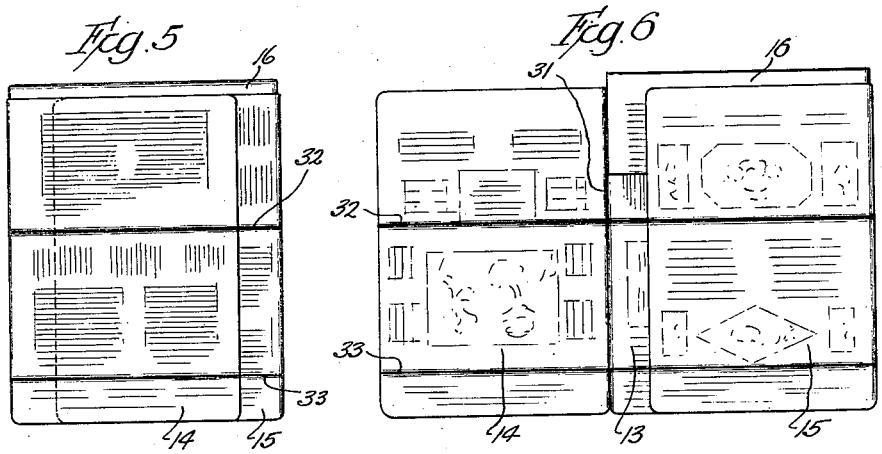
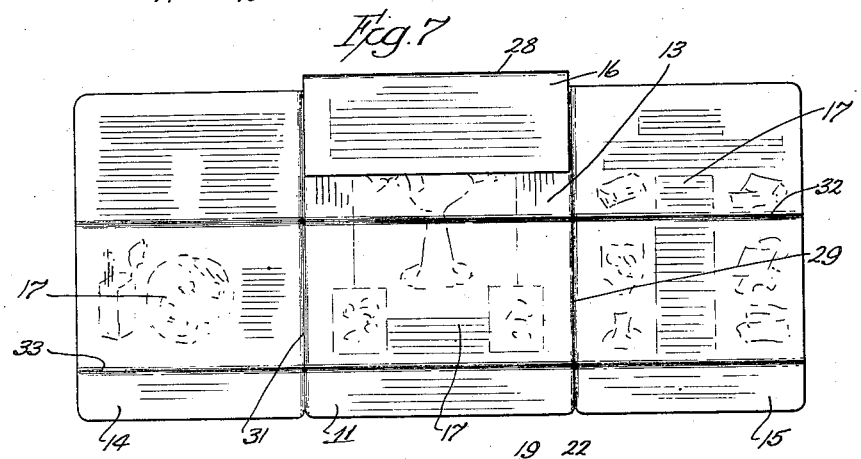
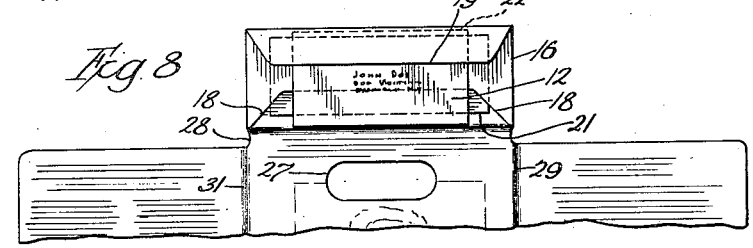
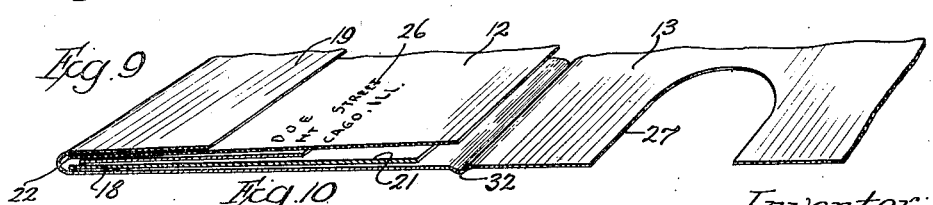
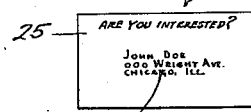
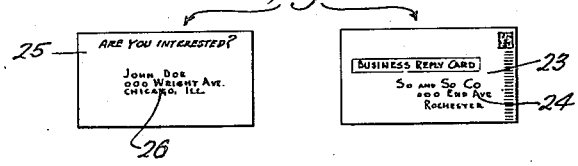
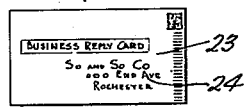
Inventor:
Louis Galter
John C. Carpenter
Atty.

Patented Mar. 13, 1934

1,951,144

UNITED STATES PATENT OFFICE 1,951,144

MAILING FOLDER

Louis Galter, Chicago, Ill., assignor to Dosch-Kircher Organization, Inc., Chicago, Ill., a corporation of Delaware Application March 30, 1933, Serial No. 663,467

6 Claims. (Cl. 229—92.8)

This invention relates to advertising mailing folders and has for its object broadly the provision of a mailing folder preferably consisting of a single, large, folded advertising sheet and a return or mailing card which will be previously addressed to the advertiser and previously provided with the name and address of the addressee of the folder, the parts being generally so constructed and arranged that the name and address of the addressee may serve as directions for delivery of the folder by the postman. Folders made in accordance with the instant invention are intended to facilitate mailing by the advertiser and return of inquiries or orders by the prospective customer.

The invention contemplates the mailing of an advertising folder to the prospective customer with a single typing, printing, or writing of his name and address upon a return card, and without requiring addressing of the body sheet or advertising matter sent him.

The most important object of the invention is the provision of an advertising mailing folder which will display the desired advertising matter in direct and convincing manner, together with immediate facility for inquiry by the prospect, and without requiring that he do other than merely check upon a return post-card and drop the same in the mail.

Another important object of the invention is the provision of a mailing folder consisting in the main of a folded sheet adapted to contain supplemental matter, such, for example, as price lists, additional illustration and the like, and a mailing card, the parts of which will be so folded together as to form a secure folded package without a supplemental enclosing envelope, and also one in which the name and address of the prospect is observed through a window opening.

Numerous other objects and advantages of the invention will be better understood from the following description, which, taken in connection the accompanying drawings, discloses a preferred embodiment thereof.

Referring to the drawings:

Fig. 5 is a back view with the body sheet in flat conditon and the side and top wings folded into place;

Figs. 6 and 7 are similar views showing the position of the parts, Fig. 6 with one side wing open, and Fig. 7 with both side wings open;

Fig. 8 is a partial top plan view showing the parts in the position they assume when the folder has been fully opened by the prospect;

Fig. 9 is an enlarged sectional perspective of the top of the folder and showing the arrangement of a price list and return card in position; and Fig. 10 is a view schematically illustrating the mailing card.

Figure 1:
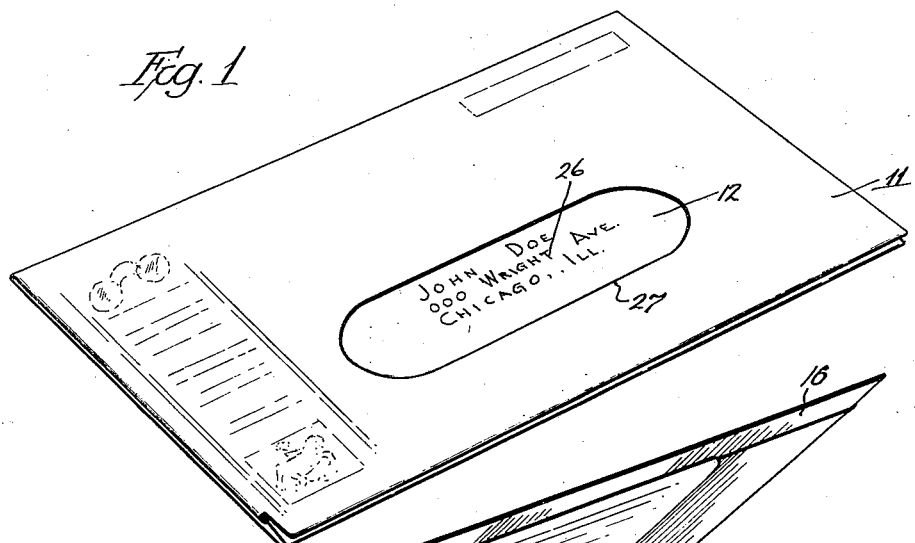
Figure 1 is a perspective view of an advertising mailing folder embodying the instant invention and showing it in condition for mailing.
Figure 2:
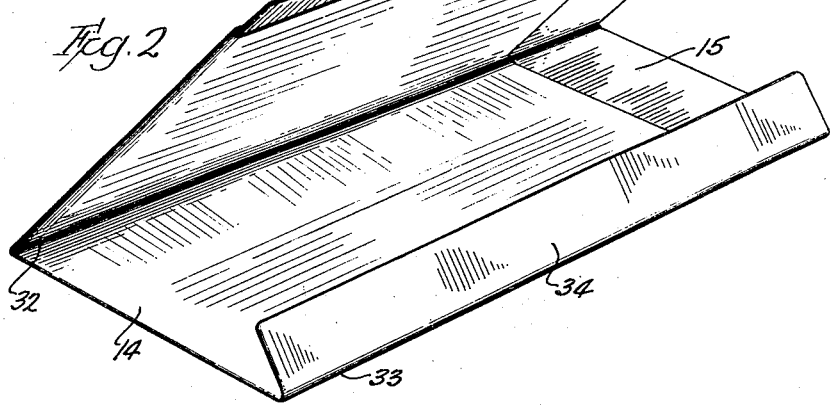
Fig. 2 is a perspective view looking from the lower edge of the folder with the parts in their position for the closing into final mailing condition.
Figure 3:
Fig. 3 is an end view of the mailing folder in Fig. 1.

The mailing folder shown on the drawings to illustrate the embodiment of the invention at present preferred, consists essentially of a sheet 11 and a mailing card 12. The sheet 11 is comprised of a central body part 13 and right and left hand wings 14 and 15 and a top wing 16. The wings 14 and 15 are or may be of the height of the body part 13 and of substantial width so that when the sheet is unfolded and laid flat, advertising matter generally indicated at 17 may be displayed upon all of the presented face. The top wing is provided with end flaps 18 adapted to be laid over toward each other into overlapping relation. A top flap 19 is provided at the top of the wing 16 and in position to overlie the end flaps 18. Adhesive may be applied between the ends of the flap 19 and the presented surfaces of the flaps 18 to form an envelope in the top wing to receive a price list, folder, or other additional advertising matter, as indicated at 21. The central portion of the flap 19 is free of adhesive and a pocket is provided between the flap 19 and the overlapping or central parts of the flaps 18 to receive an edge 22 of the return mailing card 12.

This card, which is shown more particularly in Fig. 10, has an address side 23, upon which the name and address 24 of the advertiser is displayed. Upon its back there is or may be displayed a question, indicated by reference character 25, to be answered by the prospect, and therebelow his name and address is typed, printed, or otherwise displayed at 26.

A window opening 27 is arranged through the body part 13 of the folder sheet, as indicated in Figs. 1 and 8. This window is so arranged with respect to the edge of the sheet and the top wing 16 that the name and address of the prospect printed or otherwise displayed upon the return mailing card will be arranged back of the window opening when the top wing is folded onto the body sheet along a line of fold 28, i. e., from the position shown in Fig. 8 to that shown in Fig. 7.

Figure 4:
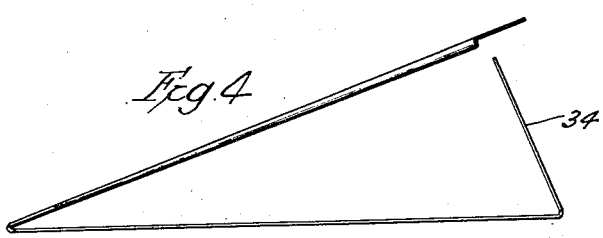
Fig. 4 is a similar view of the mailing folder in the condition shown in Fig. 2.

The mailing folder is prepared for mailing by inserting the price list or other matter 21 in the envelope (if additional matter is to accompany the mailing folder), inserting the top edge of the return mailing card in the pocket beneath the flap 19, then folding the top wing over onto the body portion 13 of the sheet, as already described. Thereafter the two side wings 14 and 15 are folded upon lines of fold 29 and 31 onto the body part 13, as may be observed by viewing Figs. 7, 6 and 5. The multiple folded sheet thus provided is then folded transversely or horizontally along a line of fold 32, somewhat above the vertical center of the body sheet. A second transverse fold is made upwardly along a lower line of fold 33 to arrange the parts in the position shown in Fig. 4. From this position the bottom part 34 may be tucked in between the tops of the side wings 14 and 15 and the presented face of the infolded top wing 16, to form a final self-locked and self-contained mailing package, as shown in Fig. 1. The name of the prospect to whom the advertisement is addressed is thus displayed through the window opening 27 and from the back of the return mailing card itself.

No special addressing operation is required in the mailing of the folder, the name and address being provided upon the mailing card, as already described. Upon being received by the prospect, a reversal of the folding operations described is easily accomplished and the entire advertising matter is automatically spread before the prospect, who in response need do nothing more than check the answer to the question or questions upon the message side of the mailing card and mail it.

It is thought that the invention and many of its attendant advantages will be understood from the foregoing description, and it will be apparent that various changes may be made in the form, construction and arrangement of the parts without departing from the spirit and scope of the invention or sacrificing all of its material advantages, the form hereinbefore described being merely a preferred embodiment thereof.

I claim:

1. A mailing folder, comprising a sheet having an address display opening and folded adjacent said opening to provide a pocket for receiving an edge of a return post-card and a post-card displaying upon its rear face the name and address of the addressee of the folder and engaged in said pocket, said pocket having such arrangement with respect to said opening that upon folding over of the pocket upon the body of the sheet, the name and address of the addressee will be displayed through said opening.

2. A mailing folder, comprising a sheet having a pocket extending from the body of the sheet and foldable upon it and having an opening in said body, and a card extending from said pocket and arrangeable across said opening when said pocket is folded upon the body of said sheet to display matter upon said card through said opening.

3. A mailing folder, comprising a sheet having an envelope and a pocket arranged along a side of the body of said sheet, and having an address display opening through said body, said envelope portion being foldable upon the body of the sheet across said opening to permit display of an address upon a card carried in said pocket through said opening.

4. A mailing folder, comprising a sheet having a side wing at each side foldable upon the central body portion of the sheet, and a top wing folded to provide a top pocket for reception of an edge of a return mailing card, and having also an opening through the body portion of said sheet, said wings being foldable on the body portion to display the name and address upon the message side of the mailing card through said opening with the side wings upon the top of the top wing.

5. A mailing folder, comprising a sheet having a side wing at each side foldable upon the central body portion of the sheet, and a top wing folded to provide a top pocket for reception of an edge of a return mailing card, and having also an opening through the body portion of said sheet, said wings being foldable on the body portion to display the name and address upon the message side of the mailing card through said opening with the side wings upon the top of the top wing, said top wing having also its side edges folded into an envelope.

6. A mailing folder, comprising a sheet having a side wing at each side foldable upon the central body portion of the sheet, and a top wing folded to provide a top pocket for reception of an edge of a return mailing card, and having also an opening through the body portion of said sheet, said wings being foldable on the body portion to display the name and address upon the message side of the mailing card through said opening with the side wings upon the top of the top wing, and the folded sheet thus formed being again foldable into a flat, self-contained mailing folder.

LOUIS GALTER.